Dec. 1, 1970  L. G. McGILL  3,543,580
LIQUID LEVEL INDICATOR
Filed April 25, 1969
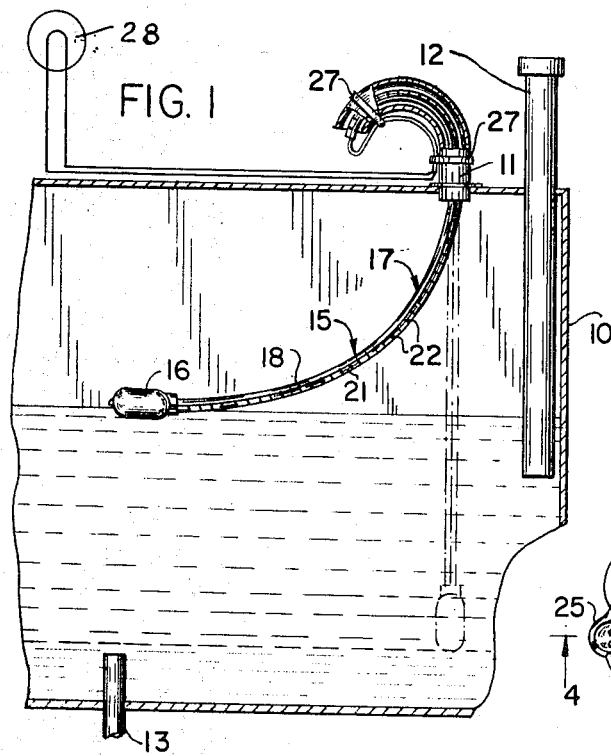
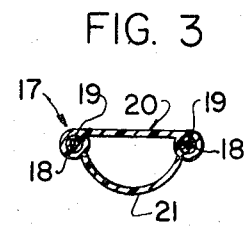
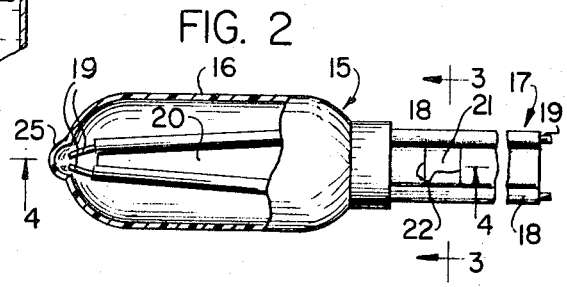
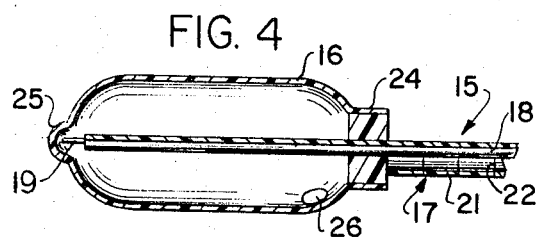
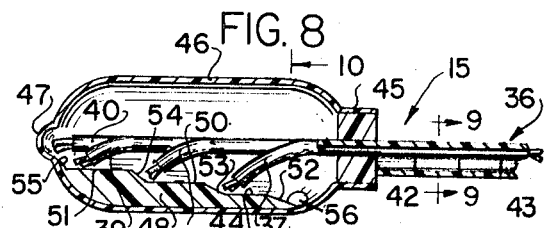
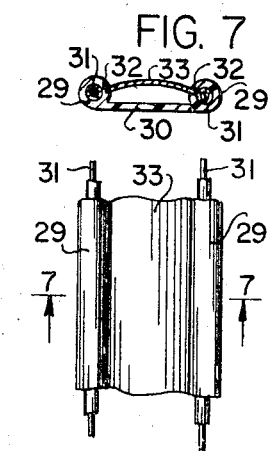
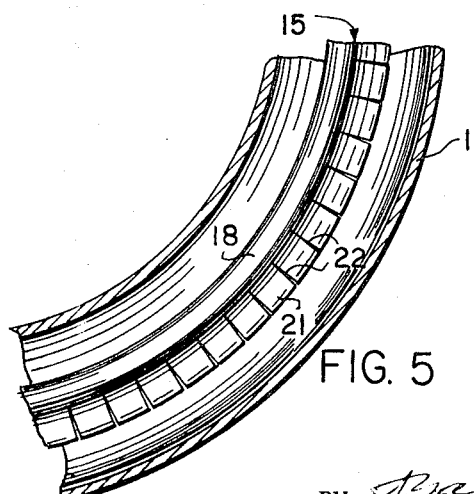
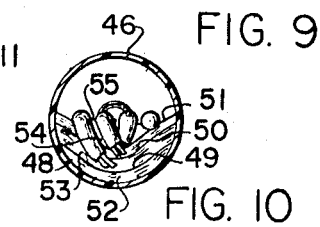
INVENTOR
LANDON G. McGILL
BY
ATTORNEYS United States Patent Office 3,543,580
Patented Dec. 1, 1970

3,543,580
LIQUID LEVEL INDICATOR
Landon G. McGill, P.O. Box 127, St. Pauls, N.C. 28384
Filed Apr. 25, 1969, Ser. No. 819,328
Int. Cl. G01f 23/10
U.S. Cl. 73—313                              3 Claims

ABSTRACT OF THE DISCLOSURE

Apparatus for indicating when a container of liquid requires replenishment including a flexible support member extending into the container a distance less than the depth thereof and with such support member being easily bendable in one direction but resisting bending in any other direction. A mercury switch type float is mounted on one end of the support member and is connected electrically to a signal in a remote position and adapted to energize the signal when the liquid within the container reaches a predetermined level.

BACKGROUND OF THE INVENTION

Field of the invention

This invention relates generally to the measuring and indicating of the volume of liquid within a container and relates particularly to apparatus which automatically indicates when the liquid within the container is in need of replenishment.

Description of the prior art

Heretofore many devices have been provided for indicating the level of liquid normally stored within a closed container. Most of these devices have utilized a float mounted on a rod and movable up and down in accordance with the liquid level within the container. In most cases it has been necessary to prepare a separate opening in the container to accommodate the float and at times some of these floats have been disposed at an angle and have become jammed so that they do not operate properly. Also some of these prior art devices have been expensive to purchase and install, particularly in existing installations and some have constituted fire hazards when the contents of the container were combustible.

SUMMARY OF THE INVENTION

The present invention is a device automatically for indicating the level of material within a closed container such as an oil tank or the like, and such device includes a freely floating bulb having a globule of mercury therein. Such bulb is connected to one end of a flexible support member which can bend easily in one direction but which resists bending in any other direction. The bulb is connected electrically to a signal so that when the material within the container reaches a predetermined level the globule of mercury will function as a switch to complete an electrical circuit to the signal.

It is an object of the invention to provide a relatively simply inexpensive liquid level indicator which can be attached to a conventional closed container and which will close an electrical circuit automatically when the contents of the container reach a predetermined level. The indicator includes a flexible support member which can bend easily in one direction only and which has a free floating bulb with a globule of mercury therein to close an electrical circuit when a predetermined level is reached.

Another object of the invention is to provide a liquid level indicator which will indicate automatically one at a time when each of a plurality of separate levels has been reached by the liquid within the container.

BRIEF DESCRIPTION OF THE DRAWING

FIG. 1 is a side elevation of a tank illustrating one application of the invention;

FIG. 2, an enlarged plan view of the liquid level indicator per se;

FIG. 3, an enlarged vertical section along the line 3—3 of FIG. 2;

FIG. 4, a longitudinal section along the line 4—4 of FIG. 2;

FIG. 5, an enlarged fragmentary detail section of the device as it is inserted within a conventional tank;

FIG. 6, a plan view of a modified form of indicator support member;

FIG. 7, a vertical section along the line 7—7 of FIG. 6;

FIG. 8, a section similar to FIG. 4 of a modified form of float;

FIG. 9, an enlarged section along the line 9—9 of FIG. 8; and

FIG. 10, a vertical section along the line 10—10 of FIG. 8.

DESCRIPTION OF THE PREFERRED EMBODIMENTS

With continued reference to the drawing, a closed container or tank 10 is provided for containing fuel oil, water, gasoline, or other liquid, and such tank normally has a vent 11 with a generally semi-circular portion providing communication with the atmosphere while resisting the introduction of foreign material into the tank. The tank has a filling tube 12 and a discharge 13 through which material is removed for use elsewhere.

In the normal installation of a fuel tank or the like, no provision has been made to indicate when the contents of the tank need replenishing, and therefore the usual practice has been to insert a dip stick or other object into the tank periodically to ascertain the amount of fuel therein or, in some cases, a service man will make periodic calls to fill the tank regardless of the amount of fuel therein. When a dip stick has been used, it has been necessary to remove the filling cap and insert the stick through the filling tube and into the liquid. Sometimes the dip stick has a deposit of foreign matter such as dirt or the like on the same which is introduced into the fluid in the tank and which dirt or foreign matter subsequently will pass out through the discharge 13. This foreign matter frequently has caused oil burners or the like to lose effectiveness and has required the services of a trained mechanic to clean the burners and restore efficient operation.

The present invention includes an indicator 15 having a hollow bulb 16 connected to one end of a lead or flexible support member 17 extending into the tank 10 a distance less than the depth of such tank. As disclosed in FIGS. 1–5 the support member 17 includes a pair of spaced, generally parallel flexible insulated conduits 18 having electricity carrying wires 19 embedded therein, and such conduits may be connected by an integral web 20. A generally semi-circular arcuate member 21 is connected along one edge to one of the conduits 18 and along the other edge to the other conduit. The arcuate member 21 is provided with a plurality of spaced transverse slots 22 so that the conduits 18 and the web 20 are freely flexible in one direction, in which case the slots are permitted to open as illustrated in FIG. 5, but such slots will be closed in any other direction to resist the flexing of the support member 17.

The conduits 18 extend through and are secured to a plug or seal 24 located in one end of the bulb 16. The conduits 18 extend substantially through the bulb 16 where the insulation is removed to expose a short section of wire 19 within the confines of the bulb 16. Preferably the bulb has a dimple or enlargement 25 at the end opposite the plug 24 and the bared ends of the wires extend into such enlargement. A globule of mercury 26 is located within the bulb 16 so that when the bulb is floating in a substantially horizontal position such globule will be out of contact with the bared ends of the wires. However, when the material within the tank has been depleted so that the bulb 16 is substantially in a vertical position, the globule of mercury will gravitate into the dimple or enlargement 25 and will bridge the bared ends of the wires 19 and complete a circuit. The indicator 15 is inserted into the tank 10 through the vent 11 after which the support member is fastened to the exterior of such vent by clamps 27 to retain the indicator in position. The wires 19 preferably are connected to an alarm system such as a light, buzzer, or other indicator 28 which would call attention to the fact that the material within the tank is in need of replenishment.

With reference to FIGS. 6 and 7 a modified form of support member is provided which includes spaced, generally parallel conduits 29 connected by an integral web 30. An electric current carrying wire 31 is embedded within the conduits 29 in a manner similar to that previously described. Each of the conduits 29 has a recess or groove 32 extending along the same in facing relation with each other. Such grooves are adapted to receive the opposite sides of a relatively thin strip or tape 33 of flexible material such as sheet metal or the like which preferably is generally arcuate in cross-section so that it will readily bend in one direction but which will resist bending in any other direction. It is contemplated that the web 30 may be omitted and the conduits 29 may be mounted on the tape 33 in any desired manner.

With reference to FIGS. 8–10, another modified form of indicator is provided including a support member 36 having a plurality of spaced, generally parallel conduits 37, 38, 39 and 40 connected by an integral web 41. Conduits 37 and 40 are connected by an arcuate member 42 having slots 43 and such arcuate member is of a construction similar to the arcuate member 21. Each of the conduits 37–40 has a pair of electric current carrying wires 44 embedded therein. The conduits 37–40 extend through a plug or seal 45 and into a hollow bulb 46 having a dimple or enlargement 47 on the end opposite the plug 45. The bulb 46 is provided with a trough 48 having a plurality of steps or terraces 49, 50 and 51 and such terraces slope downwardly from the periphery of the bulb toward the longitudinal center thereof. The terrace 49 is connected to the bottom of the bulb by a shallow inclined portion 52, the terraces 49 and 50 are connected by a slightly steeper inclined portion 53, the terraces 50 and 51 are connected by a still steeper inclined portion 54, and the upper terrace 51 is connected to the dimple 47 by a relatively steep inclined portion 55.

The wires in the conduit 37 curve downwardly and terminate in the pocket created between the terrace 49 and the inclined portion 53. The wires in the conduit 38 curve downwardly and terminate in the pocket created between the terrace 50 and the inclined portion 54. The wires in the conduit 39 curve downwardly and terminate in the pocket between the terrace 51 and the inclined portion 55 and the wires in the conduit 40 extend substantially through the bulb and terminate within the dimple 47. The free end of each of the conduits 37–40 is removed to bare the wires 44 carried therein.

A globule of mercury 56 is disposed within the bulb 46 and when the bulb is floating in a generally horizontal position such globule of mercury will be located in the pocket created by the inclined portion 52 and the bulb 46. When the liquid level within the tank begins to recede the bulb 46 will assume a position other than horizontal. When a predetermined liquid level has been reached the mercury will move by gravity over the inclined portion 52 and into the pocket between the terrace 49 and the inclined portion 53. In this position the mercury will bridge the exposed wires of the conduit 37 and will complete a circuit to energize a signal, such as a white light (not shown).

When the liquid level continues to recede a second predetermined liquid level will be reached at which time the mercury will move out of the pocket between the terrace 49 and the inclined portion 53 and will move by gravity into the pocket between the terrace 50 and the inclined portion 54. In this position the mercury will bridge the wires of the conduit 38 and will complete a circuit to energize a second signal which may constitute a green light (not shown).

Upon further depletion of the liquid within the tank the bulb will reach a third predetermined level at which time the mercury will leave the pocket between the terrace 50 and the inclined portion 54 and will gravitate into the pocket between the terrace 51 and the inclined portion 55. In this position the mercury will bridge the wires of the conduit 39 and will complete a circuit to energize a third signal which may constitute a yellow light (not shown).

As the fluid within the tank continues to be depleted the bulb 46 will assume substantially a vertical position whereupon the globule of mercury 56 will gravitate into the dimple 47 and will bridge the wires of the conduit 40 to complete a circuit which will energize another signal, such as a red light (not shown), which will indicate that the contents of the tank are seriously depleted and should be replenished as soon as possible.

It is noted that whereas four conduits have been described and illustrated, the invention is not limited to four but may have either more or less conduits. Also the signaling devices are not limited to colored lights, nor is the sequence of colors an important feature.

It will be apparent that a relatively simple liquid level indicator has been provided which can be easily attached to a conventional liquid storage tank and which will energize a warning or alarm system to indicate when the contents of the tank should be replenished.

I claim:

1. A liquid level indicator having a portion for insertion within a liquid containing tank, said indicator comprising an elongated generally cylindrical hollow buoyant bulb, a globule of mercury freely movable within said bulb, a relatively thin flexible support member having a concave surface with one end of said support member being connected to said bulb, said support member extending into said tank a distance less than the depth thereof, said support member being easily bendable in the direction of the concave surface only, spaced generally parallel electric current-carrying means mounted on opposite sides of said support member, as least one pair of said current-carrying means extending substantially through said bulb and generally along the longitudinal axis thereof, said one pair of electric current-carrying means having exposed ends located adjacent to the end of said bulb remote from said support member, said buoyant bulb normally floating on top of the liquid within said tank and generally in a substantially horizontal position so that the globule of mercury remains at the bottom of the bulb and out of engagement with the exposed ends of said current-carrying means while material is being discharged from said tank until the liquid level falls to a position substantially equal to the length of the support member within said tank and causes said bulb to move to a position wherein the longitudinal axis of said bulb is in a substantially vertical plane at which time the mercury will bridge the gap between the exposed ends of said current-carrying means and complete a circuit, signal means connected to said current-carrying means, and means for mounting said support member on said tank so that one end of said support member is fixed.

2. The structure of claim 1 in which said support member includes a plurality of spaced slots to facilitate bending in one direction.

3. The structure of claim 1 in which said buoyant bulb includes a terraced multi-level structure disposed along the bottom thereof when the bulb is in horizintal position, said terraces being connected by angular surfaces so that the globule of mercury will move from terrace to terrace as the bulb is lowered, a plurality of current-carrying means extending into said bulb, each pair of current-carrying means having exposed ends, one pair of exposed ends being located adjacent to each terrace in a position to be engaged by said mercury, whereby said pairs of current-carrying means will be engaged sequentially as the mercury moves across said terraced structure.

References Cited

UNITED STATES PATENTS

| | | | |
|---|---|---|---|
| 2,441,698 | 5/1948 | Gerspacher et al. | 174—117(.4)X |
| 2,254,068 | 8/1941 | Frank | 174—117(.1)X |
| 3,291,934 | 12/1966 | Mealy | 200—84(.2) |
| 3,440,375 | 4/1969 | Wood | 200—84(.2) |

FOREIGN PATENTS

| | | |
|---|---|---|
| 1,304,739 | 8/1961 | France. |
| 1,357,360 | 2/1964 | France. |

LOUIS R. PRINCE, Primary Examiner

D. M. YASICH, Assistant Examiner

U.S. Cl. X.R.

174—117; 200—84